United States Patent Office 3,238,253
Patented Mar. 1, 1966

3,238,253
OXIDATION OF ALPHA, BETA UNSATURATED ALDEHYDES IN THE PRESENCE OF A CATALYST CONTAINING V, P, Mn AND O
Ralph O. Kerr, Houston, Tex., assignor to Petro-Tex Chemical Corporation, Houston, Tex., a corporation of Delaware
No Drawing. Filed Feb. 20, 1961, Ser. No. 90,227
5 Claims. (Cl. 260—530)

This invention relates to a process and a catalyst for the vapor phase oxidation of lower aliphatic aldehydes to aliphatic acids of the same number of carbon atoms. The catalyst and process of this invention are particularly useful in the oxidation of acrolein or methacrolein to acrylic and methacrylic acids, respectively.

Unsaturated acids such as methacrylic have been produced by the liquid phase oxidation of unsaturated aldehydes in a solvent. However, this method has the disadvantage of requiring a solvent recovery and the disadvantage of generally requiring expensive oxidizing agents such as peroxides. Acrylic acid has been prepared by the reaction of ethylene oxide with HCN to produce hydroxypropionitrile which is then alcoholized in the presence of sulfuric acid to produce the ester. The ester is then dehydrated with $P_2O_5$. It is desirable to have a process whereby a more direct and less expensive method of preparation of these acids is accomplished.

It is accordingly an object of this invention to provide an improved process for obtaining high yields of unsaturated acids by the vapor phase oxidation of unsaturated aldehydes. It is another object of this invention to provide an improved process for the vapor phase oxidation of monoethylenically unsaturated aldehydes such as acrolein and methacrolein to acrylic and methacrylic acid respectively. It is a further object of this invention to produce a novel and improved catalyst which is useful in obtaining increased yields of products by vapor phase catalytic oxidation of unsaturated aldehydes to the unsaturated acid, and to a method of making the same. Other objects will be apparent from the description thereof which follows.

According to the present invention, a method has been discovered whereby unsaturated aldehydes may be oxidized to acids in the vapor phase using oxygen as an oxidant together with some water vapor and a novel catalyst for the process. The catalysts of this invention contain vanadium, phosphorus, manganese and oxygen chemically bonded together as a complex. The atomic ratio of the phosphorus, vanadium and manganese should be present in relative proportions of about 0.15 to 0.50 atom of vanadium to about 0.30 to 0.70 atom of phosphorus to about 0.05 to 0.35 atom of manganese. The preferred proportions are from about 0.20 to 0.40 atom of vanadium to 0.40 to 0.65 atom of phosphorus to about 0.10 to 0.30 atom of manganese. The atomic ratio of oxygen to the remaining components of the catalyst, when the catalyst is being used to catalyze the oxidation, is difficult to determine and is probably not constant due to the competing reactions of oxidation and reduction taking place during the reaction at the high temperatures.

The catalyst may be prepared in a number of ways. A preferred method to obtain catalysts which produce high yields of acid upon oxidation of aldehydes is whereby the catalyst complex is formed in solution and deposited as a solution onto a carrier. According to one preferred solution method, the vanadium is present in solution with an average valence of less than plus 5 in the finally formed complex in solution. Preferably, the vanadium has an average valence of less than plus 5 at the time the solution of catalyst complex is deposited onto the carrier, if a carrier is used. The reduced vanadium with a valence of less than 5 may be obtained either by initially using a vanadium compound wherein the vanadium has a valence of less than 5 such as vanadyl chloride, or by initially using a vanadium compound with a valence of plus 5 such as $V_2O_5$ and thereafter reducing to the lower valence with, for example, hydrochloric acid during the catalyst preparation to form the vanadium oxysalt, vanadyl chloride, in situ. The vanadium compound may be dissolved in a reducing solvent which solvent functions not only to form a solvent for the reaction, but also to reduce the valence of the vanadium compound to a valence of less than 5. For example, a vanadium compound, phosphorus compound and manganese compound may be dissolved in any order in a suitable reducing solvent and the formation of the complex allowed to take place. Preferably the vanadium compound is first dissolved in the solvent and thereafter the phosphorus and manganese compounds are added. The reaction to form the complex may be accelerated by the application of heat. The deep blue color of the solution shows the vanadium has an average valence of less than 5. The complex formed is then, without a precipitation step, deposited as a solution onto a carrier and dried. In this preferred procedure, the vanadium has an average valence of less than plus 5 at the time it is deposited onto the carrier. Generally, the average valence of the vanadium will be between about plus 2.5 and 4.6 at the time of deposition onto the carrier.

When the above described preferred solution method is employed, reducing agents for the vanadium may be either organic or inorganic. Acids such as hydrochloric, hydroiodic, hydrobromic, acetic, oxalic, malic, citric, formic and mixtures thereof such as a mixture of hydrochloric and oxalic may be used. Sulphur dioxide may be used. Less desirably, sulfuric and hydrofluoric acids may be employed. Other reducing agents which may be employed, but which have not given as desirable catalysts are organic aldehydes such as formaldehyde and acetaldehyde; alcohols such as pentaerythritol, diacetone alcohol and diethanol amine, and additional reducing agents such as hydroxyl amines, hydrazine, and nitric oxide. Nitric acid and similar oxidizing acids which would oxidize the vanadium from a valence of 4 to 5 during the preparation of the catalyst should be avoided. Generally the reducing agents form oxysalts of vanadium. For example, if $V_2O_5$ is dissolved in hydrochloric or oxalic acid, the corresponding vanadium oxysalts are produced. These vanadium oxysalts should have as the salt forming anion an anion which is more volatile than the phosphate anion.

Another method of preparation of the catalyst complex is to dissolve the manganese compound and a vanadium compound such as ammonium metavanadate or vanadium pentoxide in an aqueous solution of phosphoric acid. After the components have been dissolved the solution is heated until precipitation occurs. The precipitant can then be dried and used as a catalyst or a carrier may be combined with the liquid phase either before or after the precipitation.

The time at which the manganese compound is incorporated into the solution is not critical so long as it is in solution before the catalyst complex is coated onto the carrier. The manganese compound may be added after the vanadium compound and the phosphorus compound have been reacted or the manganese compound may be added either before, at the same time, or after either the vanadium or phosphorus compound has been added.

Any vanadium, phosphorus and manganese compounds may be used as starting materials which when the compounds are combined and heated to dryness in air at a temperature of, for example, 350° C. will leave as a deposit a catalyst complex having relative proportions within the above described ranges. Preferred vanadium, phosphorus and manganese compounds are compounds which are essentially completely soluble under standard conditions in boiling aqueous hydrochloric acid containing 37 percent hydrochloric acid. Generally, phosphorus compounds are used which have as the cation an ion which is more volatile than the phosphate anion. Various compounds may be used, such as metaphosphoric acid, triphosphoric acid, pyrophosphoric acid, ortho-phosphoric acid, phosphorus pentoxide, phosphorus oxyiodide, ethyl phosphate, methyl phosphate, amine phosphate, phosphorus pentachloride, phosphorus trichloride, phosphorus oxybromide, and the like.

Suitable vanadium compounds useful as starting materials are compounds such as vanadium pentoxide, ammonium metavanadate, vanadyl chloride, vanadyl dichloride, vanadyl trichloride, vanadium sulfate, vanadium phosphate, vanadium tribromide, vanadyl formate, vanadyl oxalate, metavanadic acid, pyrovanadic acid, and the like. Any vanadium compound which has an anion which is either the phosphate anion or is more volatile than the phosphate anion is satisfactory.

Suitable manganese compounds are the various compounds such as the manganese halides, phosphates, oxides, carbonates, sulfates, nitrates, acetates, and so forth. Metallic manganese may be used. Generally manganese compounds are used which either have the phosphate anion as the anion or which have an anion which is more volatile than the phosphate anion. Manganese compounds which are soluble in hydrochloric acid are preferred. Compounds such as manganese dichloride, the various manganese oxides, manganese acetate, permanganic acid and the like, are useful as starting materials. Mixtures of the various vanadium, phosphorus and manganese compounds may be used as starting materials to form the described catalyst complex.

The catalyst complex containing vanadium, phosphorus and manganese may be formed by simply causing the combination of each of the ingredient components in a solution or dispersion. Heat may be applied to accelerate the formation of the complex and one method of forming the complex is by causing the ingredients to react under reflux conditions. Under reflux conditions this reaction generally takes about one to two hours.

Inert diluents such as silica may be present in the catalyst, but the combined weight of the vanadium, oxygen, phosphorus and manganese should preferably constitute at least about 50 weight percent of the composition which is coated on the carrier, if any, and preferably these components constitute at least about 75 weight percent of the composition coated on the carrier, and more preferably at least about 95 weight percent. Any remainder other than the vanadium, oxygen, phosphorus and manganese may be any essentially inert non-catalytic ingredient intimately combined with the vanadium, oxygen, phosphorus and manganese as a part of the coating on the carrier.

Although the catalysts may be separately formed and used as pellets, it is more economical and practical to deposit this material on a carrier such as aluminum oxide or silica. Before the carrier is combined with the catalyst the solution of catalyst is preferably concentrated to a solution which contains from about 30 to 80 percent volatiles, and better results have been obtained when there is from about 50 to 70 percent volatiles by weight. The carrier may be added to the catalyst solution or the catalyst solution may be poured onto the carrier. Less desirably, the Alundum or other carrier may be present during the whole course of reactions to provide the desired vanadium-oxygen-phosphorus complex. After the catalyst complex has been coated onto the carrier, the vanadium may be converted to a more active form by heating in the presence of an oxidizing gas.

The support or carrier for the vanadium-oxygen-phosphorus-manganese complex, if any, should preferably be inert to both the depositing solution containing the complex and should be inert under the catalytic oxidation conditions. The support provides not only the required surface for the catalyst, but gives physical strength and stability to the catalyst material. The carrier or support normally has a low surface area, as usually measured, from about .001 to about 5 square meters per gram. A desirable form of carrier is one which has a dense non-absorbing center and a rough enough surface to aid in retaining the catalyst adhered thereto during handling and under reaction conditions. The carrier may vary in size but preferably is from about 2½ mesh to about 10 mesh in the Tyler Standard screen size. Alundum particles as large as ¼ inch are satisfactory. Carriers much smaller than 10 to 12 mesh normally cause an undesirable pressure drop in the reactor. Very useful carriers are Alundum and silicon carbide or Carborundum. Any of the Alundums or other inert alumina carriers of low surface may be used. Likewise, a variety of silicon carbides may be employed. Silica gel may be used. The amount of the catalyst complex on the carrier is usually in the range of from about 10 to about 30 weight percent of the total weight of complex plus carrier and more preferably from about 14 to about 24 weight percent on an inert carrier such as Alundum. The amount of the catalyst complex deposited on the carrier should be enough to substantially coat the surface of the carrier and this normally is obtained with the ranges set forth above. With more absorbent carriers, larger amounts of material will be required to obtain essentially complete coverage of the carrier. In the case of silicon carbide, about 25 percent of catalyst is normally used. Excess catalyst over that required to coat the carrier surface is not necessary and usually will be lost by mechanical attrition. The final particle size of the catalyst particles which are coated on a carrier will also preferably be about 2½ to about 10 mesh size. The carriers may be of a variety of shapes, the preferred shape of the carriers is in the shape of cylinders or spheres. Although more economical use of the catalyst on a carrier in fixed beds is obtained, the catalyst may be employed in fluid bed systems. Of course, the particle size of the catalyst used in fluidized beds is quite small, varying from about 10 to about 150 microns and in such systems the catalyst normally will not be provided with a carrier but will be formed into the desired particle size after drying from solution.

The reaction involves contacting the aldehydes in vapor phase in low concentration with the described catalyst, oxygen and steam. Once reaction is begun, it is self sustaining because of the exothermic nature of the reaction. A variety of reactors will be found to be useful and multiple tube heat exchanger type reactors are quite satisfactory. The tubes of such reactors may vary in diameter from about ¼ inch to about 3 inches, and the length may be varied from about 3 to about 10 or more feet. As mentioned, the oxidation reaction is an exothermic reaction and, therefore, relatively close control of the reaction temperature should be maintained. It is desirable to have the surface of the reactors at a relatively constant temperature and some medium to conduct heat from the reactors is necessary to aid temperature control. Such media may be Woods metal, molten sulfur, mercury, molten lead, and the like, but it has been found that eutectic salt baths are completely satisfactory. One such salt bath is a sodium nitrate-sodium nitrite-potassium nitrate eutectic constant temperaure mixture. An additional method of temperature control is to use a metal block reactor whereby the metal surrounding the tube acts as a temperature regulating body. As will be recognized by the man skilled in the art, the heat exchange medium will be kept at the proper temperature by heat exchangers and the like. The reactor or reaction tubes may be iron, stainless steel, carbon-steel, nickel, glass tubes such as Vycor and the like. Both carbon-steel and nickel tubes have excellent long life under the conditions of the reactions described herein. Normally, the reactors contain a preheat zone of an inert material such as ¼ inch Alundum pellets, inert ceramic balls, nickel balls or chips and the like, present at about one-half to one-fourth the volume of the active catalyst present.

The gaseous feed to the reactor contains a low concentration of unsaturated aldehyde, oxygen and water vapor. Generally, an inert gas is also present such as nitrogen or helium. The oxygen is usually added in the form of air or as air enriched with oxygen. The aldehyde is generally present in concentrations of about 0.50 to 3.0 mol percent of the total feed excluding steam with a preferred range of about 0.80 to 2.0 mol percent. The oxidation may also be conducted at higher concentrations such as 10 to 20 volume percent or higher of aldehyde based on the total feed excluding steam. Steam will be present from about 5 to 95 mol percent of the total feed. Oxygen may be present from about one-half to 40 mols per mol of aldehyde with a preferred ratio of about 1.5 to 25 mols per mole of aldehyde. When no inert diluent gases are used the preferred ratio is from 1.5 to 4.0 moles oxygen per mole of aldehyde. When air is used as the source of the oxygen, the preferred ratio is from about 10 to 20 moles oxygen per mole of aldehyde.

The temperature of the reaction at the center of the reactor should be within the range of from about 150 to 600° C. The highest conversions are usually obtained in the range of 200 to 525° C. Because the reaction is exothermic, means for conducting the heat away from the reactor are normally employed. The temperature may be controlled by conventional methods such as the use of brass block reactors, or reactors surrounded by a salt bath. When using salt baths, best results are obtained when the temperature at the center of the reactor is no greater than 50° C. and generally less than 10° C. above the temperature of the salt bath. The temperature of the reaction will be dependent somewhat upon the size of the reactor and upon the concentration of aldehyde in the feed. Normally, the temperature of the salt bath will be from about 200 to 500° C.

The flow rate of the gaseous stream through the reactor may be varied within rather wide limits, but a preferred range of operations is at the rate of about 20 to 200 grams of aldehyde per liter of catalyst per hour and more preferably about 50 to about 100 grams of aldehyde per liter of catalyst per hour. Residence times of the gas stream will normally be less than about 20 seconds, more preferably from about 0.1 to 3.0 seconds. When higher concentrations of aldehyde are fed, the higher contact times may be used.

The pressure on the reactor is not generally critical, and the reaction may be conducted at atmospheric, superatmospheric or below atmospheric pressure. The exit pressure will be at least slightly higher than the ambient pressure to insure a positive flow from the reactor. The pressure of the inert gases must be sufficiently high to overcome the pressure drop through the reactor.

The catalyst and the processes of the present invention are useful for the production of aliphatic acids from lower aliphatic aldehydes generally. Both saturated and unsaturated aldehydes of from 3 to 6 carbon atoms may be used.

The preferred starting materials are the monoethylenically unsaturated aliphatic monoaldehydes of from 3 to 6 carbon atoms such as acrolein, crotonaldehyde, methacrolein, 2-methyl-2-butenal, 2-methyl-2-pentenal, and the like. Best results have been obtained with acrolein and methacrolein. Mixtures of aldehydes with other aldehydes or with hydrocarbons may be used. For example, a mixture of methacrolein and isobutylene may be fed as the starting material. If desired, the reactor effluent may be recycled to the reactor for increased yields.

The unsaturated acid product may be recovered by a number of ways well known to those skilled in the art. For example, the acid may be condensed, or scrubbed with water, or other suitable solvents, followed by separation of the unsaturated acid product.

The unsaturated acid products of this invention have many well known commercial uses, particularly as monomers for polymer formation or in the formation of esters such as methyl methacrylate.

The following examples are intended to be only illustrative rather than limiting the invention.

*Example 1*

A catalyst for the oxidation of methacrolein to methacrylic acid was prepared as follows:

53.7 g. of vanadium pentoxide was added to 500 ml. of 37% hydrochloric acid at room temperature. The mixture was refluxed slowly for about 24 hours. A blue solution was obtained, showing that the vanadium had an average valence of less than plus 5. 19.5 g. of $MnO_2$ was added, and the solution was refluxed for four hours. The solution was cooled to about 40° C. and 57.17 g. of $P_2O_5$ was cautiously added to the solution and the mixture was again refluxed for about 24 hours. The resulting deep blue solution was evaporated to about 250 ml. and the solution was deposited onto 480 g. of hydrochloric acid extracted 1/8 x 1/8 in. cylindrical Alundum pellets. The carrier particles coated with the complex were then dried at low temperatures to remove the volatiles. A free flowing catalytic material was obtained which had the catalyst complex uniformly deposited on the surface of the Alundum particles. The catalyst particles were then heated at 300° C. in air for a period of about one hour with the time of heat up to 300° C. being about four hours. The coated Alundum contained 20 weight percent of the complex based on the weight of the carrier plus complex. The complex which was coated on the carrier had a relative atomic proportion of 0.40 vanadium to 0.45 phosphorus to 0.15 manganese.

A 3 foot long, 3/4 inch I.D. nickel reactor tube surrounded by a salt bath was loaded with 300 ml. of the catalyst. On top of the catalyst was loaded 100 ml. of 6 mm. x 6 mm. Vycor Raschig rings to form a preheat zone. A gaseous mixture containing 90 mol percent steam based on the total feed, 0.8 percent methacrolein based on the total feed excluding steam, and the remainder oxygen was to the reactor at a rate to provide 70 g. of methacrolein per liter of catalyst per hour. At a salt bath temperature of 470° C. and a temperature at the center of the reactor of about 467° C., methacrylic acid was produced at a yield of 47 mol percent based on the weight of methacrolein fed. Also produced were 12 mol percent acetic acid together with lower oxidation products. The methacrylic acid was recovered by bubbling the gaseous stream through water.

*Example 2*

The general procedure of Example 1 was repeated. A catalyst complex was used which had an atomic ratio of 0.30 vanadium, 0.55 phosphorus and 0.15 manganese. The complex was deposited onto 1/8 x 1/8 inch Alundum cylindrical pellets to give 20 weight percent complex based on the total weight of carrier and complex. The gaseous feed contained 0.3 mol percent methacrolein based on the total weight of the feed excluding steam. The feed rate of methacrolein was 26 g. methacrolein per liter of catalyst per hour. Steam was present in the feed at a concentration of 57 mol percent of the total feed; the remainder of the gaseous feed was air. The same reactor was used as in Example 1 and again 300 ml. of catalyst followed by 100 ml. of Vycor Raschig rings were used. At a salt bath temperature of 450° C. and an internal temperature of about 445° C., the yield of methacrylic acid was 47 mol percent based on the methacrolein fed, 14 mol percent of the methacrolein fed was unreacted.

*Example 3*

The general procedure of Example 1 was repeated. A catalyst was used which had an atomic ratio of 0.35 vanadium, 0.50 phosphorus, and 0.15 manganese. The complex was deposited onto ⅛ x ⅛ inch Alundum cylindrical pellets to give 20 weight percent complex based on the total weight of carrier and complex. The gaseous feed contained 0.33 mol percent methacrolein based on the total weight of the feed excluding steam. The feed rate of methacrolein was 35 g. methacrolein per liter of catalyst per hour. Steam was present in the feed at a concentration of 40 mol percent of the total feed; the remainder of the gaseous feed was air. The same reactor was used as in Example 1 and again 300 ml. of catalyst followed by 100 ml. of Vycor Raschig rings were used. At a salt bath temperature of 415° C. and an internal temperature of about 410° C., the yield of methacrylic acid was 37 mol percent based on the methacrolein fed. 28 mol percent of the methacrolein feed was unreacted.

When the above catalysts were used with acrolein feed, similarly high yields of acrylic acid were produced.

I claim:

1. A process for the oxidation of unsaturated aliphatic aldehydes to the corresponding acids which comprises contacting at a temperature of between 150° C. and 600 C. a gaseous mixture of an unsaturated aliphatic aldehyde selected from the group consisting of acrolein, crotonaldehyde, methacrolein, 2-methyl-2-butenal and 2-methyl-2-pentenal, oxygen, and steam with a catalytic complexed composition comprising a complex of vanadium, oxygen, phosphorus, and manganese, wherein the catalytic complex constitutes at least 50 percent of said composition and wherein the relative atomic proportions of the catalyst are from about 0.15 to 0.50 atom of vanadium to about 0.30 to 0.70 atom of phosphorus to about 0.05 to 0.35 atom of manganese, said aldehyde being present in a concentration of about 0.50 to 3.0 mol percent based on the total gaseous mixture excluding steam and wherein said aldehyde is introduced at a rate of between 20–200 grams of aldehyde per liter of catalyst per hour and wherein the oxygen is present from about one-half to 40 mols of oxygen per mol of aldehyde and the steam being present in an amount of between 5 and 95 percent based on the total gaseous mixture.

2. The process of claim 1 wherein the unsaturated aldehyde is methacrolein.

3. The process of claim 1 wherein the unsaturated aldehyde is acrolein.

4. The process of claim 1 wherein the catalytic complexed composition is deposited on an inert carrier wherein the catalytic complex is present on the carrier from about 10 to about 30 weight percent based on the total weight of the catalytic complex plus carrier.

5. The process of claim 4 wherein the inert carrier is silica.

References Cited by the Examiner

UNITED STATES PATENTS

| | | | |
|---|---|---|---|
| 1,445,544 | 2/1923 | Odinga | 260—530 |
| 1,985,750 | 12/1934 | Thomas et al. | 260—530 |
| 2,153,406 | 4/1939 | Bauer | 260—530 |
| 2,210,469 | 8/1940 | Staudinger | 260—530 |
| 2,464,825 | 3/1949 | Nielsen | 252—437 |
| 2,744,928 | 5/1956 | Smith et al. | 260—530 |
| 2,816,081 | 12/1957 | Heath et al. | 252—437 |
| 2,850,463 | 9/1958 | Romanovsky et al. | 252—437 |
| 2,881,212 | 4/1959 | Idol et al. | 260—530 |
| 3,087,964 | 4/1963 | Koch et al. | 260—530 |

LORRAINE A. WEINBERGER, *Primary Examiner.*

CHARLES B. PARKER, LEON ZITVER, *Examiners.*